United States Patent
Fujiwara et al.

(10) Patent No.: US 11,525,057 B2
(45) Date of Patent: Dec. 13, 2022

(54) METHOD FOR MANUFACTURING ROOM-TEMPERATURE-CURABLE ORGANOPOLYSILOXANE COMPOSITION, ROOM-TEMPERATURE-CURABLE ORGANOPOLYSILOXANE COMPOSITION, AND ARTICLE

(71) Applicant: SHIN-ETSU CHEMICAL CO., LTD., Tokyo (JP)

(72) Inventors: Akitsugu Fujiwara, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 138 days.

(21) Appl. No.: 16/753,402

(22) PCT Filed: Sep. 21, 2018

(86) PCT No.: PCT/JP2018/034971
§ 371 (c)(1),
(2) Date: Apr. 3, 2020

(87) PCT Pub. No.: WO2019/069706
PCT Pub. Date: Apr. 11, 2019

(65) Prior Publication Data
US 2020/0317919 A1   Oct. 8, 2020

(30) Foreign Application Priority Data

Oct. 6, 2017 (JP) .............................. JP2017-196019

(51) Int. Cl.
| | | |
|---|---|---|
| C08L 83/04 | (2006.01) | |
| C09D 183/04 | (2006.01) | |
| C09J 183/04 | (2006.01) | |
| C08K 3/013 | (2018.01) | |
| C08K 5/5419 | (2006.01) | |
| C08K 5/544 | (2006.01) | |
| C09D 7/00 | (2018.01) | |
| C09D 7/80 | (2018.01) | |

(52) U.S. Cl.
CPC .......... *C08L 83/04* (2013.01); *C09D 183/04* (2013.01); *C09J 183/04* (2013.01); C08L 2205/025 (2013.01); C08L 2205/05 (2013.01); C08L 2314/00 (2013.01); C08L 2666/54 (2013.01); C09D 7/00 (2013.01); C09D 7/80 (2018.01)

(58) Field of Classification Search
None
See application file for complete search history.

(56) References Cited

U.S. PATENT DOCUMENTS

| | | | |
|---|---|---|---|
| 4,511,728 A | 4/1985 | Kreuzer et al. | |
| 4,593,065 A | 6/1986 | Fukayama et al. | |
| 4,962,152 A | 10/1990 | Leempoel | |
| 10,759,909 B2* | 9/2020 | Gutacker | ............... C09J 183/04 |
| 2012/0016072 A1 | 1/2012 | Ederer et al. | |
| 2013/0338289 A1 | 12/2013 | Jadot et al. | |
| 2016/0017195 A1 | 1/2016 | Pichl et al. | |
| 2018/0002353 A1 | 1/2018 | Gutacker et al. | |
| 2018/0016400 A1* | 1/2018 | Gutacker | ............... C08L 83/04 |

FOREIGN PATENT DOCUMENTS

| | | |
|---|---|---|
| CN | 105238342 A | 1/2016 |
| CN | 107523257 A | 12/2017 |
| JP | 58-185594 A | 10/1983 |
| JP | 61-51056 A | 3/1986 |
| JP | 3-41157 A | 2/1991 |
| JP | 2010-537015 A | 12/2010 |
| JP | 5399392 B2 | 1/2014 |
| JP | 2014-513158 A | 5/2014 |
| JP | 2016-516101 A | 6/2016 |
| WO | WO 2016/146648 A1 | 9/2016 |
| WO | WO 2016/146685 A1 | 9/2016 |
| WO | WO 2018/091582 A1 | 5/2018 |

OTHER PUBLICATIONS

International Search Report, issued in PCT/JP2018/034971, PCT/ISA/210, dated Dec. 25, 2018.
Written Opinion of the International Searching Authority, issued in PCT/JP2018/034971, PCT/ISA/237, dated Dec. 25, 2018.

* cited by examiner

*Primary Examiner* — Tae H Yoon
(74) *Attorney, Agent, or Firm* — Birch, Stewart, Kolasch & Birch, LLP

(57) ABSTRACT

Through the present invention, by undergoing a step in which a straight-chain diorganopolysiloxane having silanol groups at both terminal ends of the molecular chain thereof, a hydrolyzable silane and/or a partial hydrolysis condensate thereof having a hydrolyzable group capable of detaching a lactic acid ester, and an amino-group-containing hydrolyzable organosilane and/or a partial hydrolysis condensate thereof are pre-mixed/reacted in advance and silanol groups at both terminal ends of the molecular chain of a main agent (base polymer) are blocked by specific hydrolyzable silyl groups, it is possible to manufacture a lactic-acid-ester-type room-temperature-curable organopolysiloxane composition excellent in all characteristics including curability, adhesive properties, workability, and the like that were not attainable by the conventional lactic-acid-ester-type room-temperature curable (RTV) silicone rubber composition.

3 Claims, No Drawings

METHOD FOR MANUFACTURING ROOM-TEMPERATURE-CURABLE ORGANOPOLYSILOXANE COMPOSITION, ROOM-TEMPERATURE-CURABLE ORGANOPOLYSILOXANE COMPOSITION, AND ARTICLE

CROSS-REFERENCE TO RELATED APPLICATIONS

This application is the U.S. National Phase of PCT/JP2018/034971, filed Sep. 21, 2018, which claims priority under 35 U.S.C. § 119(a) to Application No. 2017-196019 filed in Japan, on Oct. 6, 2017, the entire contents of all of which are expressly incorporated by reference into the present application.

TECHNICAL FIELD

This invention relates to a method for preparing a room temperature curable organopolysiloxane composition having excellent adhesion, by using a linear diorganopolysiloxane having silanol groups at both ends of the molecular chain as a starting material for the base polymer; a room temperature curable organopolysiloxane composition comprising a linear diorganopolysiloxane blocked at both ends of the molecular chain with a silyl group containing a lactate-releasing hydrolyzable group as the base polymer and having excellent curability and adhesion; and an article bonded by or coated with a cured product of the composition. More particularly, this invention relates to a room temperature curable organopolysiloxane composition which is applicable in bonding or coating articles such as onboard headlamp sealing members, and a method for preparing the composition.

BACKGROUND ART

Since room temperature vulcanizable (RTV) silicone rubber compositions which crosslink with moisture are easy to handle and have good weather resistance and electrical properties, they are used in a variety of fields including sealants for building members and adhesives in electric and electronic fields. Most of these RTV silicone rubber compositions are designed as comprising organopolysiloxane terminated with silanol groups as the base polymer.

As is well known in the art, RTV silicone rubber compositions are of various condensation cure types including alcohol release, oxime release and acetic acid release types, which are used in a variety of applications. For example, RTV silicone rubber compositions of alcohol release type are widely used as adhesive or coating for securing electric and electronic parts, adhesive for vehicles, and the like. RTV silicone rubber compositions of oxime and acetic acid release types are mainly used as building member sealing material because of relatively fast cure, but carry with them a safety problem because they give off toxic or irritating odor gases upon curing. Also the compositions of oxime and acetic acid release types must be used with care because of the potential risk of corrosion of adherends.

Meanwhile, the recent automobile industry marks an outstanding advance. With the impact on the environment being considered, hybrid cars, fuel cell cars and electric vehicles are becoming the mainstream of the industry. Because of its excellent heat resistance, weather resistance and processability, silicone rubber is used at any sites, for example, as gasket materials around engines, heat dissipating and sealing materials in the vicinity of engine control units (ECU), and potting materials for booster circuits in inverters. With the advantage of weather resistance taken into account, RTV silicone rubber compositions are considered suitable as sealing material for headlamps. In the specification where an antifogging agent is coated, a phenomenon is observed that the antifogging agent is corroded with by-product gases released from the RTV silicone rubber compositions. It is believed that since any by-products (alcohols, oximes or acetic acid) outgassed due to condensation reaction have low boiling points, they react with the antifogging agent to alter it, detracting from antifogging performance. For this reason, hot-melt materials based on polyurethane or the like are used as the headlamp sealing material. In the present status, however, the polyurethane-based materials have extremely low heat resistance as compared with the silicone rubber, and pose an undesirably heavy burden to the installation because of the hot-melt nature.

Accordingly, there is the demand for a headlamp sealing material which is convenient to use, efficient to work with, curable, and adhesive. Recently, Patent Document 1 (JP 5399392) discloses as the advanced cure technology a RTV silicone rubber composition of the lactate release type due to condensation reaction. Patent Document 1 describes that a RTV silicone rubber composition comprising a polydimethylsiloxane having silanol groups at both ends of the molecular chain and an (ethyl lactato)-silane is superior in the human health and environment aspects as compared with the prior art oxime release type; and that the composition is friendly to the working environment because the smell is weak and not discomfort as compared with the prior art cure type. In Patent Document 1, however, the RTV silicone rubber composition is constructed to find application as sealants and thus has a very slow cure speed (or very long cure time). Since a slow cure speed results in the prolongation of a standby time until the completion of curing, it is difficult for the composition to find applications other than the sealant. There is still room for improvement. No reference is made to adhesion and working efficiency.

PRIOR ART DOCUMENTS

Patent Documents

Patent Document 1: JP 5399392

SUMMARY OF INVENTION

Technical Problem

An object of the invention, which has been made under the above-mentioned circumstances, is to provide a method for preparing a room temperature curable organopolysiloxane composition which satisfies all properties including curability, adhesion and working efficiency, which are not achievable by prior art RTV silicone rubber compositions of lactate removal type; a room temperature curable organopolysiloxane composition of lactate release type which has the foregoing properties and is suitable as a sealant to automobile headlamps; and an article bonded by or coated with a cured product of the composition, such as automobile headlamp sealing member.

Solution to Problem

Making extensive investigations to attain the above object, the inventors have found that a room temperature curable organopolysiloxane composition of lactate release type can be prepared by premixing a linear diorganopolysiloxane having silanol groups at both ends of the molecular chain, a hydrolyzable silane having a lactate-releasing hydrolyzable group and/or a partial hydrolytic condensate thereof, and an amino group-containing hydrolyzable organosilane and/or a partial hydrolytic condensate thereof, and letting them react for blocking the silanol groups at both ends of the molecular chain of the base polymer with specific hydrolyzable silyl groups, so that the resulting composition satisfies all properties including curability, adhesion and working efficiency, which are not achievable by prior art RTV silicone rubber compositions of lactate release type; and that the room temperature curable organopolysiloxane composition of lactate release type having the foregoing properties is suitable as a sealant to automobile headlamps. The invention is predicated on this finding.

Accordingly, the present invention provides a method for preparing a room temperature curable organopolysiloxane composition, the room temperature curable organopolysiloxane composition, and an article bonded by or coated with the composition, as defined below.

[1]

A method for preparing a room temperature curable organopolysiloxane composition, wherein components (A) to (E) are:

(A) 100 parts by weight of an organopolysiloxane having the general formula (1):

[Chem. 1]

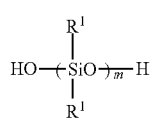

(1)

wherein $R^1$ is independently a substituted or unsubstituted $C_1$-$C_{10}$ monovalent hydrocarbon group and m is an integer of at least 10, (B) 0.1 to 30 parts by weight of a hydrolyzable organosilane compound having the general formula (2) and/or a partial hydrolytic condensate thereof,

[Chem. 2]

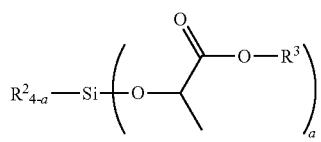

(2)

wherein $R^2$ and $R^3$ are each independently a substituted or unsubstituted $C_1$-$C_{10}$ monovalent hydrocarbon group and a is 3 or 4, (C) 0.1 to 10 parts by weight of an amino-containing hydrolyzable organosilane and/or a partial hydrolytic condensate thereof, other than component (B), (D) 1 to 800 parts by weight of an inorganic filler, and (E) 0.001 to 20 parts by weight of a curing catalyst, said method comprising the steps of premixing and reacting a mixture of components (A), (B), and (C), to form a reaction mixture containing the reaction product of components (A) and (B), and mixing the reaction mixture with components (D) and (E) until uniform.

[2]

The method for preparing a room temperature curable organopolysiloxane composition according to [1], wherein component (C) is at least one member selected from amino-containing hydrolyzable organosilanes having the general formulae (3), (4) and (4') and partial hydrolytic condensates thereof,

[Chem. 3]

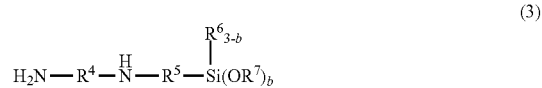

(3)

wherein $R^4$ is a $C_7$-$C_{10}$ divalent hydrocarbon group containing an alkylene moiety and aromatic ring, $R^5$ is a $C_1$-$C_{10}$ divalent hydrocarbon group, $R^6$ and $R^7$ each are an unsubstituted $C_1$-$C_{10}$ monovalent hydrocarbon group, b is 2 or 3, with the proviso that at least one of the primary and secondary amine moieties is not directly bonded to the aromatic ring in $R^4$,

(4)

(4')

wherein Y is a $C_1$-$C_{15}$ mono- or divalent hydrocarbon group containing at least two nitrogen atoms in its structure, Z is a substituted or unsubstituted $C_1$-$C_{10}$ divalent hydrocarbon group which may contain a heteroatom, R is one or more monovalent groups selected from $C_1$-$C_6$ hydrolyzable groups and $C_1$-$C_6$ monovalent hydrocarbon groups, at least two of the three silicon-bonded groups R being hydrolyzable groups.

[3]

The method for preparing a room temperature curable organopolysiloxane composition according to [1] or [2], wherein the step of premixing and reacting a mixture of components (A), (B), and (C) is under conditions including a temperature of 0 to 60° C. and a mixing time of 10 to 120 minutes.

[4]

The method for preparing a room temperature curable organopolysiloxane composition according to any one of [1] to [3], wherein the organopolysiloxane composition has a tack-free time at 23° C. of less than 10 minutes.

[5]

A room temperature curable organopolysiloxane composition comprising:

(A') 100 parts by weight of a linear diorganopolysiloxane blocked at both ends of the molecular chain with a hydrolyzable silyl group containing two or three hydrolyzable groups of the formula: —O—CH(CH$_3$)—C(=O)O—R$^3$ wherein $R^3$ is a substituted or unsubstituted $C_1$-$C_{10}$ monovalent hydrocarbon group, (B) 0.1 to 30 parts by weight of a hydrolyzable organosilane compound having the general formula (2) and/or a partial hydrolytic condensate thereof,

[Chem. 4]

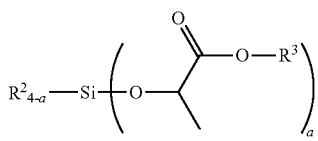

(2)

wherein $R^2$ and $R^3$ are each independently a substituted or unsubstituted $C_1$-$C_{10}$ monovalent hydrocarbon group and a is 3 or 4, (C) 0.1 to 10 parts by weight of an amino-containing hydrolyzable organosilane and/or a partial hydrolytic condensate thereof, other than component (B), (D) 1 to 800 parts by weight of an inorganic filler, and (E) 0.001 to 20 parts by weight of a curing catalyst.

[6]

The room temperature curable organopolysiloxane composition of [5] wherein component (A') is a linear diorganopolysiloxane having the general formula (1'):

[Chem. 5]

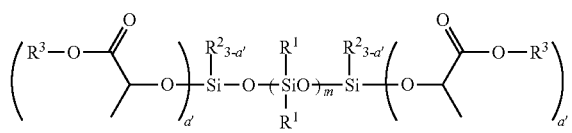

(1')

wherein $R^1$ is independently a substituted or unsubstituted $C_1$-$C_{10}$ monovalent hydrocarbon group, $R^2$ and $R^3$ are each independently a substituted or unsubstituted $C_1$-$C_{10}$ monovalent hydrocarbon group, m is an integer of at least 10, and a' is 2 or 3.

[7]

The room temperature curable organopolysiloxane composition of [5] or [6] wherein component (C) is at least one member selected from amino-containing hydrolyzable organosilanes having the general formulae (3), (4) and (4') and partial hydrolytic condensates thereof,

[Chem. 6]

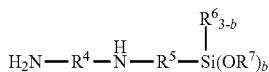

(3)

wherein $R^4$ is a $C_7$-$C_{10}$ divalent hydrocarbon group containing an alkylene moiety and aromatic ring, $R^5$ is a $C_1$-$C_{10}$ divalent hydrocarbon group, $R^6$ and $R^7$ each are an unsubstituted $C_1$-$C_{10}$ monovalent hydrocarbon group, b is 2 or 3, with the proviso that at least one of the primary and secondary amine moieties is not directly bonded to the aromatic ring in $R^4$, $$Y=N-Z-SiR_3 \quad (4)$$

$$Y-NH-Z-SiR_3 \quad (4')$$

wherein Y is a $C_1$-$C_{15}$ mono- or divalent hydrocarbon group containing at least two nitrogen atoms in its structure, Z is a substituted or unsubstituted $C_1$-$C_{10}$ divalent hydrocarbon group which may contain a heteroatom, R is one or more monovalent groups selected from $C_1$-$C_6$ hydrolyzable groups and $C_1$-$C_6$ monovalent hydrocarbon groups, at least two of the three silicon-bonded groups R being hydrolyzable groups.

[8]

An article bonded by or coated with a cured product of the room temperature curable organopolysiloxane composition of any one of [5] to [7].

[9]

The article of [8], which is an onboard headlamp.

Advantageous Effects of Invention

According to the invention, a room temperature curable organopolysiloxane composition of lactate release type which satisfies all properties including curability, adhesion and efficient working, which are not achievable by prior art RTV silicone rubber compositions of lactate release type, is prepared by using a linear diorganopolysiloxane having silanol groups at both ends of the molecular chain as a starting material toward a base polymer, using a hydrolyzable silane having a lactate-releasing hydrolyzable group as a crosslinker, and combining them with an amino group-containing hydrolyzable organosilane and/or a partial hydrolytic condensate thereof, for thereby previously blocking the silanol groups at both ends of the molecular chain of the base polymer with specific hydrolyzable silyl groups. The composition is suitable as a sealant for automobile headlamps.

DESCRIPTION OF EMBODIMENTS

Now the invention is described in detail.

The invention provides a method for preparing a room temperature curable organopolysiloxane composition, comprising the steps of premixing and reacting a mixture of components (A), (B), and (C), to form a reaction mixture containing the reaction product of components (A) and (B) (i.e., component (A')), and mixing the reaction mixture (i.e., mixture of components (A'), (B) and (C)) with components (D) and (E) until uniform. Components (A) to (E) are described below.

[Component (A)]

Component (A) is used as the starting material toward the base polymer in the inventive method for preparing a room temperature curable organopolysiloxane composition. It is a linear diorganopolysiloxane which is blocked at both ends of the molecular chain with silicon-bonded hydroxyl groups (silanol groups), represented by the general formula (1).

[Chem. 7]

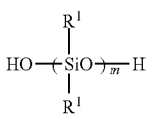

(1)

In formula (1), $R^1$ is independently a substituted or unsubstituted $C_1$-$C_{10}$, preferably $C_1$-$C_6$ monovalent hydrocarbon group. Examples include alkyl groups such as methyl, ethyl, propyl, isopropyl, butyl, isobutyl, tert-butyl, hexyl, 2-ethylhexyl, and octyl; cycloalkyl groups such as cyclohexyl; alkenyl groups such as vinyl, allyl, and propenyl; aryl groups such as phenyl and tolyl; and substituted forms of the foregoing groups in which some hydrogen is substituted by halogen, such as 3,3,3-trifluoropropyl. Of these, methyl, phenyl, and 3,3,3-trifluoropropyl are preferred. Groups $R^1$ may be the same or different.

In formula (1), m is an integer of at least 10, typically 10 to 5,000, preferably 50 to 3,000, more preferably 100 to 2,000. Differently stated, m is preferably such an integer that the diorganopolysiloxane may have a viscosity at 25° C. in the range of 25 to 100,000 mPa·s, more preferably 500 to 80,000 mPa·s.

Herein, m is the number of repeating diorganosiloxane units and indicative of a degree of polymerization or molecular weight, which may be typically determined as a number average degree of polymerization or number average molecular weight by gel permeation chromatography (GPC) using toluene as developing solvent versus polystyrene standards. Also, the viscosity may be measured by a rotational viscometer (e.g., BL, BH, BS, cone plate type, or rheometer). The same holds true, hereinafter.

[Component (B)]

Component (B) is a hydrolyzable organosilane compound having per molecule three or four lactate-releasing hydrolyzable groups of the formula: —O—CH(CH$_3$)—C(=O) O—R$^3$ wherein R$^3$ is a substituted or unsubstituted C$_1$-C$_{10}$ monovalent hydrocarbon group, represented by the general formula (2), and/or a partial hydrolytic condensate thereof.

[Chem. 8]

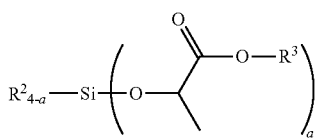

(2)

In formula (2), $R^2$ and $R^3$ are each independently a substituted or unsubstituted C$_1$-C$_{10}$ monovalent hydrocarbon group. Examples include alkyl groups such as methyl, ethyl, and propyl, cycloalkyl groups such as cyclohexyl, alkenyl groups such as vinyl and allyl, aryl groups such as phenyl and tolyl, and substituted forms of the foregoing groups in which some hydrogen is substituted by halogen, such as 3,3,3-trifluoropropyl. Of these, methyl, ethyl, and vinyl are preferred. $R^2$ and $R^3$ may be the same or different. The subscript "a" is 3 or 4, preferably 3. Also, the methine carbon bound by methyl in formula (2) can be an asymmetric center, and any of (R), (S) and racemic configurations may be assumed.

Illustrative examples of component (B) include silane compounds such as methyltris(ethyl lactato)silane, vinyltris (ethyl lactato)silane, ethyltris(ethyl lactato)silane, n-propyltris(ethyl lactato)silane, n-butyltris(ethyl lactato)silane, methyltris(methyl lactato)silane, vinyltris(methyl lactato)silane, ethyltris(methyl lactato)silane, n-propyltris(methyl lactato)silane, n-butyltris(methyl lactato)silane, methyltris (n-propyl lactato)silane, vinyltris(n-propyl lactato)silane, ethyltris(n-propyl lactato)silane, n-propyltris(n-propyl lactato)silane, and n-butyltris(n-propyl lactato)silane, as well as partial hydrolytic condensates thereof.

It is noted that the partial hydrolytic condensate refers to an organosiloxane oligomer having at least two, preferably at least three residual hydrolyzable groups in the molecule, obtained from partial hydrolytic condensation of a hydrolyzable organosilane compound as raw material (the same holds true, hereinafter).

Of the foregoing, preference is given to methyltris(ethyl lactato)silane, vinyltris(ethyl lactato)silane, methyltris(methyl lactato)silane, and vinyltris(methyl lactato)silane, with methyltris(ethyl lactato)silane and vinyltris(ethyl lactato) silane being more preferred.

Component (B) may be used alone or in admixture.

In the method for preparing a room temperature curable organopolysiloxane composition according to the invention, component (B) is such that a portion thereof undergoes, in the presence of component (C) serving as an end-blocking catalyst, condensation reaction with silanol groups at both ends of the molecular chain of component (A) for thereby blocking the terminal silanol groups with hydrolyzable silyl groups having 2 or 3 lactate-releasing hydrolyzable groups of the formula: —O—CH(CH$_3$)—CH(=O)O—R$^3$ wherein R$^3$ is a substituted or unsubstituted C$_1$-C$_{10}$ monovalent hydrocarbon group, more specifically hydrolyzable silyl groups of the formula: —Si(R$^2$)$_{3-a'}$(O—CH(CH$_3$)—C(=O) O—R$^3$)$_{a'}$, wherein R$^2$ and R$^3$ each are a substituted or unsubstituted C$_1$-C$_{10}$ monovalent hydrocarbon group, a' is 2 or 3, for thereby modifying component (A) to component (A'), specifically a linear diorganopolysiloxane having the general formula (1'):

[Chem. 9]

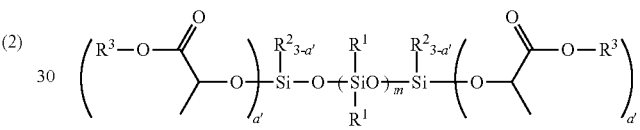

(1')

wherein $R^1$, $R^2$, $R^3$, m and a' are as defined above, while the remainder of component (B) kept unchanged acts as a crosslinker or curing agent in the room temperature curable organopolysiloxane composition obtained from the inventive method.

Typically about 5 to 40 mol %, preferably about 10 to 30 mol %, more preferably about 15 to 25 mol % of component (B) is consumed for blocking the silanol groups at both ends of the molecular chain of component (A) with terminal hydrolyzable silyl groups for modifying component (A) into component (A') whereas the remainder about 60 to 95 mol %, preferably about 70 to 90 mol %, more preferably about 75 to 85 mol % acts as a crosslinker or curing agent in the composition.

Prior to the step of premixing and reacting components (A) to (C) to form the reaction mixture containing the reaction product (i.e., component (A')) of components (A) and (B), the amount of component (B) blended is in a range of 0.1 to 30 parts by weight, preferably 0.5 to 20 parts by weight, more preferably 1 to 15 parts by weight per 100 parts by weight of component (A). If the amount of component (B) is less than 0.1 part by weight, the percent terminal blockage of component (A) is low, failing to produce a room temperature curable organopolysiloxane composition having desired rubber elasticity. If the amount of component (B) exceeds 30 parts by weight, undesirably the resulting room temperature curable organopolysiloxane composition has a slow curing speed and the cured product thereof is likely to lose mechanical properties.

In the room temperature curable organopolysiloxane composition wherein the reaction mixture containing the reaction product (i.e., component (A')) of components (A) and (B) has been prepared, the amount of component (B) is 0.1 to 30 parts by weight, preferably 0.1 to 28 parts by weight, more preferably 0.5 to 18 parts by weight, most preferably 1 to 14 parts by weight per 100 parts by weight of component (A').

[Component (C)]

Component (C) is an amino-containing hydrolyzable organosilane and/or a partial hydrolytic condensate thereof. It is a compound which exerts the important effects as an end-blocking catalyst for component (A) or organopolysiloxane terminated with silanol groups and a tackifier. It is essentially different from component (B) in that it does not contain in the molecule a lactate-releasing hydrolyzable group of the formula: —O—CH(CH$_3$)—C(=O)O—R$^3$ wherein R$^3$ is a substituted or unsubstituted C$_1$-C$_{10}$ monovalent hydrocarbon group. Preferably, component (C) is at least one member selected from amino-containing hydrolyzable organosilanes having the general formulae (3), (4) and (4') and partial hydrolytic condensates thereof.

[Chem. 10]

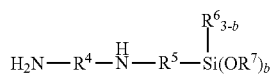
(3)

Herein R$^4$ is a C$_7$-C$_{10}$ divalent hydrocarbon group containing an alkylene moiety and aromatic ring, R$^5$ is a C$_1$-C$_{10}$ divalent hydrocarbon group, R$^6$ and R$^7$ each are an unsubstituted C$_1$-C$_{10}$ monovalent hydrocarbon group, b is 2 or 3, with the proviso that at least one of the primary and secondary amine moieties is not directly bonded to the aromatic ring in R$^4$.

Y=N—Z—SiR$_3$ (4)

Y—NH—Z—SiR$_3$ (4')

Herein Y is a C$_1$-C$_{15}$ mono- or divalent hydrocarbon group containing at least two nitrogen atoms in its structure, Z is a substituted or unsubstituted C$_1$-C$_{10}$ divalent hydrocarbon group which may contain a heteroatom, R is one or more monovalent groups selected from C$_1$-C$_6$ hydrolyzable groups and C$_1$-C$_6$ monovalent hydrocarbon groups, at least two of the three silicon-bonded groups R being hydrolyzable groups.

Reference is first made to the amino-containing hydrolyzable organosilane having formula (3) and/or partial hydrolytic condensates thereof. This amino-containing hydrolyzable organosilane has the structure that an aromatic ring intervenes between primary and secondary amine moieties and at least one of the amine moieties is not directly attached to the aromatic ring, and is described in detail in JP-A H05-105689.

In formula (3), R$^4$ is a C$_7$-C$_{10}$ divalent hydrocarbon group containing an alkylene moiety and aromatic ring, preferably a combination of a phenylene group (—C$_6$H$_4$—) with a C$_1$-C$_4$ alkylene group such as methylene, ethylene or trimethylene, for example, groups having the formulae (5) to (13).

—CH$_2$—C$_6$H$_4$— (5)

—CH$_2$—C$_6$H$_4$—CH$_2$— (6)

—CH$_2$—C$_6$H$_4$—CH$_2$—CH$_2$— (7)

—CH$_2$—C$_6$H$_4$—CH$_2$—CH$_2$—CH$_2$— (8)

—CH$_2$—CH$_2$—C$_6$H$_4$— (9)

—CH$_2$—CH$_2$—C$_6$H$_4$—CH$_2$— (10)

—CH$_2$—CH$_2$—C$_6$H$_4$—CH$_2$—CH$_2$— (11)

—CH$_2$—CH$_2$—CH$_2$—C$_6$H$_4$— (12)

—CH$_2$—CH$_2$—CH$_2$—C$_6$H$_4$—CH$_2$— (13)

Of these, formula (6) is most preferred.

R$^5$ is a C$_1$-C$_{10}$, preferably C$_1$-C$_6$ divalent hydrocarbon group. Examples include alkylene groups such as methylene, ethylene, propylene, tetramethylene, hexamethylene, octamethylene, decamethylene, and 2-methylpropylene, arylene groups such as phenylene, and combinations of such an alkylene group with an arylene group, preferably C$_1$-C$_4$ alkylene groups.

R$^6$ and R$^7$ are each independently an unsubstituted C$_1$-C$_{10}$, preferably C$_1$-C$_6$ monovalent hydrocarbon group. Examples include alkyl groups such as methyl, ethyl, propyl, isopropyl, butyl, isobutyl, tert-butyl, hexyl, 2-ethylhexyl and octyl, cycloalkyl groups such as cyclohexyl, alkenyl groups such as vinyl, allyl and propenyl, and aryl groups such as phenyl and tolyl. R$^6$ is preferably methyl, vinyl or phenyl, more preferably methyl. R$^7$ is preferably a C$_1$-C$_4$ alkyl group, more preferably methyl or ethyl.

Examples of the amino-containing hydrolyzable organosilane having formula (3) include those having the formulae (14) and (15). Notably, Me stands for methyl, and Et for ethyl.

[Chem. 11]

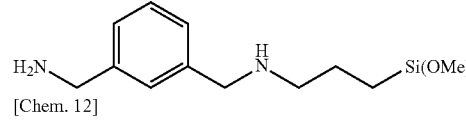
(14)

[Chem. 12]

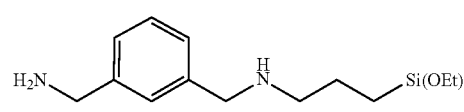
(15)

Next, the amino-containing hydrolyzable organosilanes having formulae (4) and (4') and/or partial hydrolytic condensates thereof are amino-containing hydrolyzable organosilanes containing at least 3, preferably 3 to 6, more preferably 3 to 5 nitrogen atoms per molecule and having a mono- or divalent basic site (Y) capable of developing an end-blocking catalyst function and/or partial hydrolytic condensates thereof.

In formulae (4) and (4'), the mono- or divalent basic site Y capable of developing an end-blocking catalyst function is a C$_1$-C$_{15}$, preferably C$_1$-C$_{10}$ mono- or divalent hydrocarbon group containing at least 2, preferably 2 to 5, more preferably 2 to 4 nitrogen atoms in the structure. Of the basic sites Y, the monovalent group is exemplified by a group consisting of a partial structure of 1,5,7-triazabicyclo[4.4.0]dec-5-ene having the formula (16), and the divalent group is exemplified by a strongly basic group such as a N-substituted or unsubstituted guanidyl group having the formula (17). In the formulae, the wavy line designates a point(s) of attachment to the nitrogen atom.

[Chem. 13]

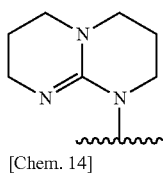
(16)

[Chem. 14]

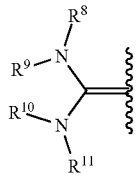
(17)

In formula (17), $R^8$ to $R^{11}$ each are selected from hydrogen or $C_1$-$C_{10}$ straight, branched or cyclic alkyl, alkenyl and aryl groups, for example, alkyl groups such as methyl, ethyl and propyl, cycloalkyl groups such as cyclohexyl, alkenyl groups such as vinyl and allyl, and aryl groups such as phenyl and tolyl. Of these, methyl, ethyl and phenyl are preferred, with methyl being most preferred. $R^8$ to $R^{11}$ may be the same or different.

In formulae (4) and (4'), each R is a monovalent group selected from $C_1$-$C_6$, preferably $C_1$-$C_4$ hydrolyzable groups (i.e., a group capable of bonding to silicon atom to form a Si—O—C bond) including alkoxy groups such as methoxy, ethoxy, propoxy, isopropoxy, butoxy, isobutoxy, and tert-butoxy, alkenyloxy groups such as vinyloxy, allyloxy, propenoxy, and isopropenoxy, ketoxime groups such as dimethylketoxime, diethylketoxime and methylethylketoxime, and acyloxy groups such as acetoxy, and $C_1$-$C_6$, preferably $C_1$-$C_4$ monovalent hydrocarbon groups including alkyl groups such as methyl and ethyl, alkenyl groups such as vinyl, and aryl groups such as phenyl. Of the three silicon-bonded groups R, at least two, preferably three groups R are hydrolyzable groups.

Examples of the hydrolyzable silyl group (—$SiR_3$) include alkoxysilyl groups such as trimethoxysilyl, methyldimethoxysilyl, vinyldimethoxysilyl, phenyldimethoxysilyl, and triethoxysilyl, isopropenoxysilyl groups such as triisopropenoxysilyl, methyldiisopropenoxysilyl, ethyldiisopropenoxysilyl, vinyldiisopropenoxysilyl, and phenyldiisopropenoxysilyl, and ketoximesilyl groups such as tris(dimethylketoxime)silyl, tris(diethylketoxime)silyl, and tris(ethylmethylketoxime)silyl.

In formulae (4) and (4'), Z is a substituted or unsubstituted $C_1$-$C_{10}$, preferably $C_1$-$C_6$ divalent hydrocarbon group which may contain a heteroatom such as oxygen or nitrogen, typically a straight, branched or cyclic alkylene group, alkenylene group, or arylene group, or a combination thereof. Examples include alkylene groups such as methylene, ethylene, propylene, tetramethylene, hexamethylene, octamethylene, decamethylene, and 2-methylpropylene, arylene groups such as phenylene, combinations of such an alkylene group with an arylene group, and the foregoing alkylene groups separated by ketone, ester or amide. Of these, methylene, ethylene, propylene, and propylene separated by an amide bond are preferred, with propylene being most preferred.

Examples of the amino-containing hydrolyzable organosilane having formula (4) or (4') include those having the formulae (18) to (25). Notably, Me stands for methyl, Et for ethyl, and Ph for phenyl.

[Chem. 15]

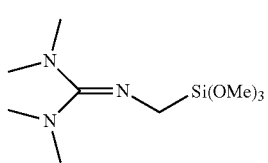
(18)

[Chem. 16]

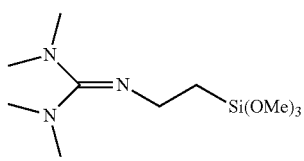
(19)

[Chem. 17]

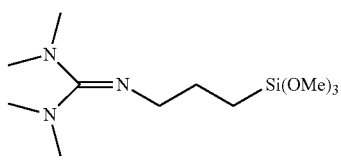
(20)

[Chem. 18]

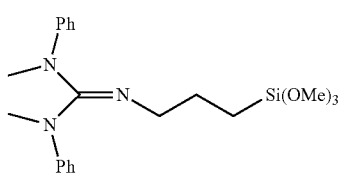
(21)

[Chem. 19]

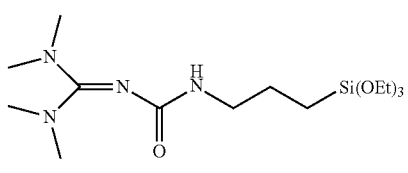
(22)

[Chem. 20]

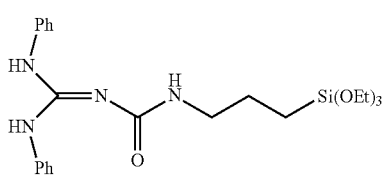
(23)

[Chem. 21]

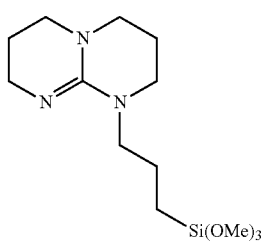
(24)

[Chem. 22]

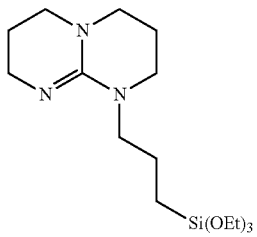

(25)

Of these, preference is given to N-methyl-substituted guanidyl-containing trialkoxysilanes, specifically N-methyl-substituted guanidyl-containing trimethoxysilanes having formulae (18), (19) and (20), more specifically γ-(N,N'-dimethylguanidyl)propyltrimethoxysilane having formula (20).

Prior to the step of premixing and reacting components (A) to (C) to form the reaction mixture containing the reaction product (i.e., component (A')) of components (A) and (B), the amount of component (C) blended is 0.1 to 10 parts by weight, preferably 0.2 to 5 parts by weight, more preferably 0.5 to 3 parts by weight per 100 parts by weight of component (A). If the amount of component (C) is too small, the percent terminal blockage of component (A) becomes low, or the cured product has reduced adhesion. An excess of component (C) is detrimental in cost and the resulting composition loses shelf stability.

In the room temperature curable organopolysiloxane composition wherein the reaction mixture containing the reaction product (i.e., component (A')) of components (A) and (B) has been prepared, the amount of component (C) is in a range of 0.1 to 10 parts by weight, preferably 0.2 to 5 parts by weight, more preferably 0.5 to 3 parts by weight per 100 parts by weight of component (A').

[Component (D)]

Component (D) is an inorganic filler examples of which include ground silica, fumed silica, wet silica, crystalline silica, aluminum hydroxide, alumina, boehmite, magnesium hydroxide, magnesium oxide, calcium hydroxide, calcium carbonate, zinc carbonate, basic zinc carbonate, zinc oxide, titanium oxide, carbon black, glass beads, glass balloons, resin beads, and resin balloons, which may be used alone or in combination of two or more. The inorganic filler may or may not be surface treated with any well-known treating agents. The well-known treating agents are preferably hydrolyzable group-containing polysiloxanes as described in JP-A 2000-256558, for example, but not limited thereto.

Prior to the step of premixing and reacting components (A) to (C) to form the reaction mixture containing the reaction product (i.e., component (A')) of components (A) and (B), the amount of component (D) blended is 1 to 800 parts by weight, preferably 2 to 600 parts by weight, more preferably 5 to 500 parts by weight per 100 parts by weight of component (A). If the amount of component (D) is less than 1 part by weight, the cured product has poor mechanical properties. More than 800 parts by weight of component (D) makes it difficult to formulate a room temperature curable organopolysiloxane composition having rubber elasticity.

In the room temperature curable organopolysiloxane composition wherein the reaction mixture containing the reaction product (i.e., component (A')) of components (A) and (B) has been prepared, the amount of component (D) is in a range of 1 to 800 parts by weight, preferably 2 to 600 parts by weight, more preferably 5 to 500 parts by weight per 100 parts by weight of component (A').

[Component (E)]

Component (E) is a curing catalyst which may be the same or different and which may be used alone or as a mixture of two or more. Examples include organic carboxylic acid salts and alkoxides of metals such as tin, titanium, zirconium, iron, antimony, bismuth and manganese; organic titanates and organic titanium chelates; and amine compounds and salts thereof other than component (C). Specific examples include tin compounds such as dibutyltin dilaurate, dibutyltin dioctoate, dioctyltin dilaurate, dibutyltin maleate, dimethyltin dineodecanoate, dibutyltin dimethoxide, dioctyltin dineodecanoate, and stannous octoate; titanium compounds such as tetrabutyl titanate, diisopropoxybis(acetylacetonato)titanium, and diisopropoxybis(ethylacetoacetate); amine compounds and salts thereof other than component (C) such as dibutylamine, laurylamine, and tetramethylguanidine. It is preferred to add organotin compounds, especially dialkyltin dialkoxides and dialkyltin dicarboxylates because the inventive composition is improved in curing properties such as fast cure and depth cure.

Prior to the step of premixing and reacting components (A) to (C) to form the reaction mixture containing the reaction product (i.e., component (A')) of components (A) and (B), the amount of curing catalyst (E) blended is 0.001 to 20 parts by weight, preferably 0.01 to 5 parts by weight, more preferably 0.05 to 3 parts by weight per 100 parts by weight of component (A). If the amount of component (E) is less than 0.001 part by weight, the resulting composition is not fully crosslinkable. More than 20 parts by weight of component (E) is detrimental in cost and the resulting composition has a slow curing speed.

In the room temperature curable organopolysiloxane composition wherein the reaction mixture containing the reaction product (i.e., component (A')) of components (A) and (B) has been prepared, the amount of component (E) is in a range of 0.001 to 20 parts by weight, preferably 0.01 to 5 parts by weight, more preferably 0.05 to 3 parts by weight per 100 parts by weight of component (A').

[Other Components]

In addition to the foregoing components (A) to (E), another silane coupling agent may be blended in the inventive composition. Exemplary silane coupling agents include vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, γ-mercaptopropyltrimethoxysilane, γ-glycidoxypropyltriisopropenoxysilane, and γ-glycidoxypropylmethyldiisopropenoxysilane.

While the step of premixing and reacting a mixture of components (A) to (C) to form the reaction mixture containing the reaction product of components (A) and (B) is followed by the step of uniformly mixing the reaction mixture with components (D) and (E), the silane coupling agent is preferably blended along with component (D) or (E) in the uniformly mixing step.

Prior to the step of premixing and reacting components (A) to (C) to form the reaction mixture containing the reaction product (i.e., component (A')) of components (A) and (B), the amount of other silane coupling agent blended, if used, is preferably 0.1 to 10 parts by weight, more preferably 0.2 to 5 parts by weight per 100 parts by weight of component (A).

In the room temperature curable organopolysiloxane composition wherein the reaction mixture containing the reaction product (i.e., component (A')) of components (A) and (B) has been prepared, the amount of other silane coupling agent, if used, is preferably in a range of 0.1 to 10 parts by weight, more preferably 0.2 to 5 parts by weight per 100 parts by weight of component (A').

Additives other than the foregoing components may be blended in the inventive composition.

Any well-known additives may be added insofar as the objects of the invention are not compromised. Exemplary additives include wetters or thixotropic agents such as polyethers, plasticizers such as non-reactive dimethylsilicone oil and isoparaffin, crosslinking density improvers such as network polysiloxanes consisting of trimethylsiloxy units (($CH_2$)$_3SiO_{1/2}$ units) and $SiO_2$ units.

If necessary, there may be added coloring agents such as pigments, dyes and fluorescent brighteners, mildew-proofing agents, antibacterial agents, bleed oils such as non-reactive phenylsilicone oil and fluorosilicone oil, surface modifiers such as silicone-incompatible organic liquids, and solvents such as toluene, xylene, gasoline, cyclohexane, methylcyclohexane, and low-boiling isoparaffin.

[Preparation of Composition]

The invention provides a method for preparing a room temperature curable organopolysiloxane composition, comprising the steps of premixing and reacting a mixture of components (A), (B), and (C), to form a reaction mixture containing the reaction product of components (A) and (B), and uniformly mixing the reaction mixture with components (D) and (E). The reaction product of components (A) and (B), designated component (A'), is a linear diorganopolysiloxane in which silanol groups at both ends of the molecular chain of component (A) are each blocked with a hydrolyzable silyl group having two or three lactate-releasing hydrolyzable groups of the formula: —O—CH(CH$_3$)—C(=O)O—R$^3$ wherein R$^3$ is a substituted or unsubstituted C$_1$-C$_{10}$ monovalent hydrocarbon group, more specifically a linear diorganopolysiloxane in which silanol groups at both ends of the molecular chain of component (A) are each blocked with a hydrolyzable silyl group of the formula: —Si(R$^2$)$_{3-a'}$(O—CH(CH$_3$)—C(=O)O—R$^3$)$_{a'}$ wherein R$^2$ and R$^3$ each are a substituted or unsubstituted C$_1$-C$_{10}$ monovalent hydrocarbon group, and a' is 2 or 3.

Conditions for the step of premixing and reacting a mixture of components (A), (B), and (C) include a temperature in the range of 0 to 60° C., preferably 10 to 40° C., a time of 10 to 120 minutes, preferably 20 to 90 minutes, and uniform mixing.

While the room temperature curable organopolysiloxane composition prepared through these steps contains components (A'), (B), (C), (D), and (E), it may be stored in a moisture-free atmosphere. When the composition is allowed to stand at room temperature (23° C.±10° C.), it will cure in 5 minutes to 1 week in the presence of airborne moisture.

The room temperature curable organopolysiloxane composition prepared by the above method preferably has a tack-free time of less than 10 minutes, more preferably 2 to 9 minutes as measured at 23° C. according to JIS K 6249. A tack-free time within the range is achievable by the preparation method comprising the steps of premixing and reacting a mixture of components (A), (B), and (C), to form a reaction mixture containing the reaction product of components (A) and (B), and uniformly mixing the reaction mixture with components (D) and (E).

Since the room temperature curable organopolysiloxane composition of lactate release type has excellent properties including curability, adhesion and efficient working, it is suitable as sealant for automobile headlamps.

EXAMPLES

Examples of the invention and Comparative Examples are given below by way of illustration, but not by way of limitation.

In Examples, the viscosity is as measured at 25° C. by a rotational viscometer, and DOP is a number average degree of polymerization as measured by GPC using toluene as developing solvent versus polystyrene standards. Normal temperature is 23° C.±10° C. Me stands for methyl.

Example 1

By mixing 60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., 6 parts by weight (15.2 mmol) of methyltris(ethyl lactato)silane, 2 parts by weight (4.9 mmol) of vinyltris(ethyl lactato)silane, and 0.8 part by weight of amino-containing hydrolyzable organosilane of the following formula (26) as an end-blocking catalyst for component (A) at normal temperature and pressure for 60 minutes, a reaction mixture containing a polydimethylsiloxane blocked at both ends of the molecular chain with a mixture of methylbis(ethyl lactato)silyl and vinylbis(ethyl lactato)silyl groups (molar ratio about 3:1) was prepared. Next, the reaction mixture was mixed with 8 parts by weight of fumed silica under reduced pressure (below −0.08 MPa, the same hereinafter) for 40 minutes. After the mixing under reduced pressure, 0.1 part by weight of dioctyltin dineodecanoate was added to the mixture and mixed under reduced pressure for 15 minutes, obtaining Composition 1.

[Chem. 23]

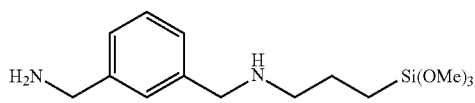

(26)

Example 2

By mixing 60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., 6 parts by weight (15.2 mmol) of methyltris(ethyl lactato)silane, 2 parts by weight (4.9 mmol) of vinyltris(ethyl lactato)silane, and 0.8 part by weight of amino-containing hydrolyzable organosilane of the above formula (26) as an end-blocking catalyst for component (A) at normal temperature and pressure for 60 minutes, a reaction mixture containing a polydimethylsiloxane blocked at both ends of the molecular chain with a mixture of methylbis(ethyl lactato)silyl and vinylbis(ethyl lactato)silyl groups (molar ratio about 3:1) was prepared. Next, the reaction mixture was mixed with 8 parts by weight of fumed silica under reduced pressure for 40 minutes. After the mixing under reduced pressure, 0.5 part by weight of γ-glycidoxypropyltrimethoxysilane and 0.1 part by weight of dioctyltin dineodecanoate were added to the mixture and mixed under reduced pressure for 15 minutes, obtaining Composition 2.

Example 3

By mixing 60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., 6.6 parts by weight (16.3 mmol) of vinyltris(ethyl lactato)silane, and 0.8 part by weight of amino-containing hydrolyzable organosilane of the above formula (26) as an end-blocking catalyst for component (A) at normal temperature and pressure for 60 minutes, a reaction mixture containing a polydimethylsiloxane blocked at both ends of the molecular chain with vinylbis(ethyl lactato)silyl groups was prepared. Next, the reaction mixture was mixed with 8 parts by weight of fumed silica under reduced pressure for 40 minutes. After the mixing under reduced pressure, 0.1 part by weight of dioctyltin dineodecanoate was added to the mixture and mixed under reduced pressure for 15 minutes, obtaining Composition 3.

Example 4

By mixing 60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., 6 parts by weight (15.2 mmol) of methyltris(ethyl lactato)silane, 2 parts by weight (4.9 mmol) of vinyltris(ethyl lactato)silane, and 0.8 part by weight of amino-containing hydrolyzable organosilane of the following formula (27) as an end-blocking catalyst for component (A) at normal temperature and pressure for 60 minutes, a reaction mixture containing a polydimethylsiloxane blocked at both ends of the molecular chain with a mixture of methylbis(ethyl lactato)silyl and vinylbis(ethyl lactato)silyl groups (molar ratio about 3:1) was prepared. Next, the reaction mixture was mixed with 8 parts by weight of fumed silica under reduced pressure for 40 minutes. After the mixing under reduced pressure, 0.1 part by weight of dioctyltin dilaurate was added to the mixture and mixed under reduced pressure for 15 minutes, obtaining Composition 4.

[Chem. 24]

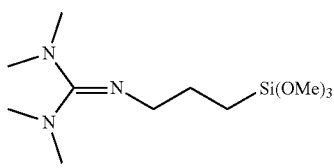

(27)

Example 5

By mixing 60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., 6 parts by weight (15.2 mmol) of methyltris(ethyl lactato)silane, 2 parts by weight (4.9 mmol) of vinyltris(ethyl lactato)silane, and 0.8 part by weight of amino-containing hydrolyzable organosilane of the above formula (27) as an end-blocking catalyst for component (A) at normal temperature and pressure for 60 minutes, a reaction mixture containing a polydimethylsiloxane blocked at both ends of the molecular chain with a mixture of methylbis(ethyl lactato)silyl and vinylbis(ethyl lactato)silyl groups (molar ratio about 3:1) was prepared. Next, the reaction mixture was mixed with 8 parts by weight of fumed silica under reduced pressure for 40 minutes. After the mixing under reduced pressure, 0.5 part by weight of γ-glycidoxypropyltrimethoxysilane and 0.1 part by weight of dioctyltin dilaurate were added to the mixture and mixed under reduced pressure for 15 minutes, obtaining Composition 5.

Comparative Example 1

60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., 6 parts by weight (15.2 mmol) of methyltris(ethyl lactato)silane, and 2 parts by weight (4.9 mmol) of vinyltris(ethyl lactato)silane were mixed at normal temperature and pressure for 60 minutes. Next, the mixture was mixed with 8 parts by weight of fumed silica under reduced pressure for 40 minutes. After the mixing under reduced pressure, 0.1 part by weight of dioctyltin dineodecanoate was added to the mixture and mixed under reduced pressure for 15 minutes, obtaining Composition 6.

Comparative Example 2

60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., and 6.6 parts by weight (16.3 mmol) of vinyltris(ethyl lactato)silane were mixed at normal temperature and pressure for 60 minutes. Next, the mixture was mixed with 8 parts by weight of fumed silica under reduced pressure for 40 minutes. After the mixing under reduced pressure, 0.1 part by weight of dioctyltin dineodecanoate was added to the mixture and mixed under reduced pressure for 15 minutes, obtaining Composition 7.

Comparative Example 3

60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., 6.6 parts by weight (16.3 mmol) of vinyltris(ethyl lactato)silane, and 0.1 part by weight of dioctyltin dilaurate were mixed at normal temperature and pressure for 60 minutes. Next, the mixture was mixed with 8 parts by weight of fumed silica under reduced pressure for 40 minutes. After the mixing under reduced pressure, 0.5 part by weight of γ-glycidoxypropyltrimethoxysilane was added to the mixture and mixed under reduced pressure for 15 minutes, obtaining Composition 8.

Comparative Example 4

60 parts by weight (2.0 mmol) of polydimethylsiloxane blocked with silanol groups at both ends of the molecular chain and having a viscosity of 50,000 mPa·s at 25° C. (DOP: about 400), 25 parts by weight of polydimethylsiloxane blocked with trimethylsilyl groups at both ends of the molecular chain and having a viscosity of 100 mPa·s at 25° C., 4 parts by weight (13.6 mmol) of methyltris(methyl ethyl ketoxime)silane, 1 part by weight (3.3 mmol) of vinyltris (methyl ethyl ketoxime)silane, and 0.8 part by weight of amino-containing hydrolyzable organosilane having the above formula (26) were mixed at normal temperature and atmospheric pressure for 60 minutes. Next, the mixture was mixed with 8 parts by weight of fumed silica under reduced pressure for 40 minutes. After the mixing under reduced pressure, 0.5 part by weight of γ-glycidoxypropyltrimethoxysilane and 0.1 part by weight of dioctyltin dilaurate were added to the mixture and mixed under reduced pressure for 15 minutes, obtaining Composition 9.

Compositions 1 to 9 thus prepared were examined for the following properties. The results are shown in Table 1.
Tack-Free Time
measured according to JIS K 6249
Initial Cure
Each of Compositions 1 to 9 thus prepared was allowed to stand in a 23° C./50% RH environment for 7 days, during which it cured to a thickness of 3 mm. Hardness was measured according to JIS K 6249.
Cure Speed
Each of Compositions 1 to 9 was placed in a glass dish of diameter 10 mm and height 13 mm and allowed to stand in a 23° C./50% RH environment for 1 day. After 1 day, the rubber which had cured from the surface in a depth direction was bored and the thickness (mm) of the cured section was measured.
Adhesion
Typical onboard headlamps are made of polycarbonate. Polycarbonate (PC) and aluminum (Al) plates of 25 mm width and 50 mm length were used as the adherend. Each of Compositions 1 to 9 was sandwiched between the adherends over a bond area of 250 mm² and a bond thickness of 2.0 mm and allowed to stand in a 23° C./50% RH environment for 7 days, yielding a shear bond specimen. The specimen was measured for shear bond force (MPa) according to JIS K 6249, and a cohesive failure (CF: cohesive failure area divided by overall fracture area, %) was computed.
Discharge
A polyethylene cartridge was filled with each of Compositions 1 to 9, which was discharged through a nozzle of diameter 3 mm under a pressure of 0.2 MPa. The amount of the composition discharged out within 5 seconds was determined.
Influence on Antifogging Agent
Onboard headlamps are sometimes coated with an antifogging agent for the antifogging purpose.
To examine the influence on the antifogging agent, 10 g of each of Compositions 1 to 9 was dispensed in a closable glass vessel of 150 ml. A polycarbonate member coated with an antifogging agent was placed in the vessel so that the polycarbonate member was out of contact with the composition, after which the vessel was completely closed. After standing at 70° C. for 3 days, any change of the antifogging agent and antifogging property were evaluated. The results of evaluation are judged as follows.
Change of Antifogging Agent
  ○: antifogging agent was not clouded or altered
  X: antifogging agent was clouded or altered
Antifogging Property
  ○: antifogging maintained
  X: antifogging not maintained, antifogging agent fogged with human breathing

TABLE 1

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
|  |  | | | | | Composition | | | | |
|  |  | 1 | 2 | 3 | 4 | 5 | 6 | 7 | 8 | 9 |
| Tack-free time (min) |  | 5 | 7 | 4 | 4 | 6 | ≥60 | ≥60 | ≥60 | 8 |
| Initial cure (Durometer A) |  | 17 | 15 | 14 | 16 | 16 | 7 | 5 | 6 | 17 |
| Cure speed (mm) |  | 3.5 | 2.9 | 3.5 | 2.8 | 2.5 | 1.2 | 1.1 | 1.0 | 3.0 |
| Adhesion to PC | (MPa) | 0.81 | 0.85 | 0.70 | 0.56 | 0.58 | 0.21 | 0.15 | 0.26 | 1.1 |
|  | CF (%) | 100 | 100 | 100 | 100 | 100 | 0 | 0 | 0 | 100 |
| Adhesion to Al | (MPa) | 0.75 | 0.81 | 0.68 | 0.52 | 0.55 | 0.20 | 0.11 | 0.22 | 1.2 |
|  | CF (%) | 100 | 100 | 100 | 100 | 100 | 0 | 0 | 0 | 100 |
| Discharge | (g) | 44 | 42 | 39 | 48 | 40 | 6.4 | 3.8 | 5.8 | 38 |
| Influence on antifogging agent | Change of antifogging agent | ○ | ○ | ○ | ○ | ○ | ○ | ○ | ○ | x |
|  | Antifogging property | ○ | ○ | ○ | ○ | ○ | ○ | ○ | ○ | x |

As is evident from the results of Examples 1 to 5, component (C) is essential in order to develop satisfactory cure, cure speed and adhesion, and a composition (Compositions 1 to 5) formulated by further using component (B) has little or no influence on the antifogging agent which is typically applied to onboard headlamps.

Compositions 6 to 8 of Comparative Examples 1 to 3, which are free of component (C), are poor in cure, adhesion and discharge.

Composition 9 of Comparative Example 4, which is free of component (B), that is, conventional room temperature curable organopolysiloxane composition of oxime release type shows satisfactory cure and other properties, but is unsuitable in the headlamp application because the antifogging agent is altered or clouded.

The invention claimed is:

1. A method for preparing a room temperature curable organopolysiloxane composition, wherein components (A) to (E) are:
   (A) 100 parts by weight of an organopolysiloxane having the general formula (1):

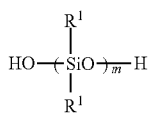
(1)

wherein $R^1$ is independently a substituted or unsubstituted $C_1$-$C_{10}$ monovalent hydrocarbon group and m is an integer of at least 10,
   (B) 0.1 to 30 parts by weight of a hydrolyzable organosilane compound having the general formula (2) and/or a partial hydrolytic condensate thereof,

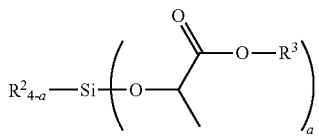
(2)

wherein $R^2$ and $R^3$ are each independently a substituted or unsubstituted $C_1$-$C_{10}$ monovalent hydrocarbon group and a is 3 or 4,
   (C) 0.1 to 10 parts by weight of an amino-containing hydrolyzable organosilane and/or a partial hydrolytic condensate thereof, other than component (B),
   wherein component (C) is at least one member selected from amino-containing hydrolyzable organosilanes having the general formulae (3), (4) and (4') and partial hydrolytic condensates thereof,

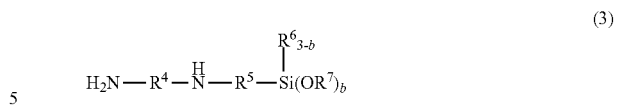
(3)

wherein $R^4$ is a $C_7$-$C_{10}$ divalent hydrocarbon group containing an alkylene moiety and aromatic ring, $R^5$ is a $C_1$-$C_{10}$ divalent hydrocarbon group, $R^6$ and $R^7$ each are an unsubstituted $C_1$-$C_{10}$ monovalent hydrocarbon group, b is 2 or 3, with the proviso that at least one of a primary and secondary amine moieties is not directly bonded to the aromatic ring in $R^4$,

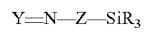
(4)

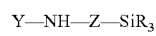
(4')

wherein Y is a $C_1$-$C_{15}$ mono- or divalent hydrocarbon group containing at least two nitrogen atoms in its structure, Z is a substituted or unsubstituted $C_1$-$C_{10}$ divalent hydrocarbon group which may contain a heteroatom, R is one or more monovalent groups selected from $C_1$-$C_6$ hydrolyzable groups and $C_1$-$C_6$ monovalent hydrocarbon groups, at least two of the three silicon-bonded groups R being hydrolyzable groups,
   (D) 1 to 800 parts by weight of an inorganic filler, and
   (E) 0.001 to 20 parts by weight of a curing catalyst,
   said method comprising the steps of premixing and reacting a mixture of components (A) and (B) under the presence of component (C), to form a reaction mixture containing the reaction product of components (A) and (B) in the presence of component (C), and mixing the reaction mixture with components (D) and (E) until uniform.

2. The method for preparing a room temperature curable organopolysiloxane composition according to claim 1, wherein the step of premixing and reacting a mixture of components (A) and (B) under the presence of component (C) is under conditions including a temperature of 0 to 60° C. and a mixing time of 10 to 120 minutes.

3. The method for preparing a room temperature curable organopolysiloxane composition according to claim 1, wherein the organopolysiloxane composition has a tack-free time at 23° C. of less than 10 minutes.

* * * * *